United States Patent [19]
Stanley et al.

[11] Patent Number: 6,109,117
[45] Date of Patent: Aug. 29, 2000

[54] SEAT WEIGHT SENSOR

[75] Inventors: James G. Stanley, Novi; James A. Campbell, Ann Arbor; Timothy E. Hughes, Livonia, all of Mich.

[73] Assignee: Automotive Systems Laboratory, Inc., Farmington Hills, Mich.

[21] Appl. No.: 08/993,677

[22] Filed: Dec. 18, 1997

Related U.S. Application Data

[60] Provisional application No. 60/032,384, Dec. 19, 1996.

[51] Int. Cl.[7] ........................................................ G01L 3/02
[52] U.S. Cl. ........................................................ 73/862.325
[58] Field of Search ........................ 73/862.325, 862.07; 280/735

[56] References Cited

U.S. PATENT DOCUMENTS

| | | | |
|---|---|---|---|
| 3,672,699 | 6/1972 | Dewindt | 280/150 |
| 3,859,485 | 1/1975 | Blinkilde et al. | 200/85 A |
| 4,987,898 | 1/1991 | Sones | 128/645 |
| 5,074,583 | 12/1991 | Fujita | 280/735 |
| 5,161,820 | 11/1992 | Volimer | 280/730 |
| 5,232,243 | 8/1993 | Blackburn et al. | 280/732 |
| 5,474,327 | 12/1995 | Schouser | 280/735 |
| 5,494,311 | 2/1996 | Blackburn et al. | 280/735 |
| 5,573,269 | 11/1996 | Gentry et al. | 280/735 |
| 5,612,876 | 3/1997 | Zeidler et al. | 364/424 |
| 5,618,056 | 4/1997 | Schoos et al. | 280/735 |
| 5,624,132 | 4/1997 | Blackburn et al. | 280/735 |
| 5,865,463 | 2/1999 | Gagnon et al. | 280/735 |

OTHER PUBLICATIONS

"The New Shape of Force Sensing Technology", Force Imaging, 12 pages.
"IMRC Prescon Sensors with Low Threshold Actuation", International Microelectronics Research Corporation, 9 pages.
"FSR Integration Guide & Evaluation Parts Catalog", Interlink Electronics, 27 pages.
"Uniforce Technical Notes", Force Imaging Technologies, 4 pages.
"Tactile Sensing, 1990's Style", Assembly, Wesley R. Iversen, Feb.–Mar. 1993, 4 pages.

Primary Examiner—William Oen
Assistant Examiner—Jewel V. Thompson
Attorney, Agent, or Firm—Lyon, P.C.

[57] ABSTRACT

A variable resistance weight sensor incorporates a plurality of force sensitive resistance elements disposed between a pair of force distributing plates. One of the force distributing plates incorporates an associated plurality of protrusions for transferring, in cooperation with the second force distributing plate, an associated component of the compressive load to the associated force sensitive resistive element, whereby the resulting resistance of the force sensitive resistive element is inversely related to the magnitude of the associated compressive load component. The force sensitive resistive elements are interconnected in series, whereby a signal processor measures the applied load from the associated series resistance. A diode connected in parallel with the series combination of force sensitive resistive elements provides a means for diagnosing the sensor.

24 Claims, 5 Drawing Sheets

SEAT WEIGHT SENSOR

CROSS-REFERENCE TO RELATED APPLICATIONS

The instant application claims the benefit of prior U.S. Provisional Application Serial No. 60/032,384 filed Dec. 19, 1996.

TECHNICAL ART

The instant invention generally relates to sensors and systems for measuring weight and more particularly to a weight sensor for measuring the weight of occupants and other objects in a motor vehicle seat such as useful determining occupant seating conditions for controlling a vehicle safety restraint sytsem.

BACKGROUND OF THE INVENTION

A vehicle may contain automatic safety restraint actuators that are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy that must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms that use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor. Fourth, known arrangements comprise a plurality of resistors that are connected in parallel so that the overall signal can be dominated by a relatively light load which is concentrated upon any one of the resistors, thereby causing a measurement which erroneously indicates a larger weight than actually present on the seat. Fifth, these arrangements do not provide any information regarding the distribution of the weight on the seat.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Finally, mechanical string potentiometer based weight sensors are complex, and subject to failure from stretching of the string.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more sensitive to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the overall height of the inflated sensor bladder must be sufficiently great to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for automatically replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The instant invention overcomes the above-noted problems by providing a variable resistance seat weight sensor element incorporating a plurality of force sensitive resistance elements disposed between a pair of force distributing plates which are substantially parallel to one another and which constitute the sensor housing. One of the force distributing plates incorporates an associated plurality of protrusions for transferring, in cooperation with the second force distributing plate, an associated component of the compressive load to the associated force sensitive resistive element, whereby the resulting resistance of the force sensitive resistive element is inversely related to the magnitude of the associated compressive load component. The force sensitive resistive elements are either incorporated into a single force sensitive resistive pad aligned with the pair of force distributing plates, or incorporated at the points of contact of the force distributing plates. The force sensitive resistive elements are interconnected in series, whereby a signal processor measures the applied load from the associated series resistance. A diode connected in parallel with the series combination of force sensitive resistive elements provides a means for diagnosing the sensor.

In a one embodiment, each force sensitive resistive element comprises a pair of force sensitive resistive contacts that engage one another, whereby the resistance through the pair of contacts is related to the applied load. In another embodiment, a first force sensitive resistive contact engages a pair of second and third force sensitive resistive contacts, whereby the pair of second and third force sensitive resistive contacts are proximate to but electrically isolated from one another—preferably interleaved with one another,—and the resistance the circuit formed by the second, first and third force sensitive resistive elements is related to the applied load.

The variable resistance seat weight sensor is incorporated into the vehicle seat below the seat cushion. In yet another embodiment, a plurality of variable resistance seat weight sensor elements are incorporated into a vehicle seat, whereby the outputs from each of the sensor elements are multiplexed to the signal processor for purposes of determining the weight distribution on the seat, from which the occupant position is inferred.

The instant invention provides a variable resistance seat weight sensor that is able to detect weights that may be too light to detect for a variable resistance force sensor that does not incorporate force distributing plates. Furthermore, the instant invention is relatively insensitive to point loads, and can provide a continuous measure of weight over the entire range of weights encountered in the automotive environment.

Accordingly, one object of the instant invention is to provide an improved seat weight sensor that provides a consistent and accurate measure of the seat loading independent of the location of the source of weight on the seat.

A further object of the instant invention is to provide an improved seat weight sensor that provides a consistent and accurate measure of the seat loading independent of the size and distribution of the source of weight on the seat.

A yet further object of the instant invention is to provide an improved seat weight sensor that provides a consistent and accurate measure of the seat loading independent of the amount of weight on the seat.

A yet further object of the instant invention is to provide an improved seat weight sensor that operates under a wide range of ambient temperature and pressure conditions.

A yet further object of the instant invention is to provide an improved seat weight sensor that can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor that can be incorporated into an intelligent safety restraint system for which the preferable mode of the activation of a controllable occupant restraint system is dependent upon the weight of the occupant.

A yet further object of the instant invention is to provide an improved seat weight sensor that does not interfere with occupant comfort.

A yet further object of the instant invention is to provide an improved seat weight sensor that is insensitive to the orientation of the seat.

A yet further object of the instant invention is to provide an improved seat weight sensor that is inexpensive to produce.

In accordance with these objectives, one feature of the instant invention is a plurality of force sensitive resistive elements incorporated in a variable resistance seat weight sensor element which are compressed between a pair of force distributing plates, one of which incorporates protrusions which further concentrate the associated pressure loading on the force sensitive resistive elements.

Another feature of the instant invention is the incorporation of three force sensitive resistive elements disposed proximate to the apexes of a triangular pattern.

Yet another feature of the instant invention is the incorporation of a plurality of variable resistance seat weight sensor elements in a vehicle seat.

Yet another feature of the instant invention is that the plural force sensitive resistive elements incorporated in a variable resistance seat weight sensor element are electrically connected in series whereby the composite resistance of the series combination is related to the amount of compressive load applied to the sensor.

Yet another feature of the instant invention is the incorporation of a diode in parallel with the series combination of force sensitive resistive elements.

Yet another feature of the instant invention is the incorporation of the force sensitive resistive elements in a modular sensor pad which is aligned with the force distributing plates.

The specific features of the instant invention provide a number of associated advantages. One advantage of the instant invention with respect to the prior art is that the protrusions on the force distributing plate act to concentrate the applied load and thereby improve the sensitivity of the weight sensor.

Another advantage of the instant invention is that the series combination of force sensitive resistive elements provides for immunity to errors caused by concentrated loads.

Yet another advantage of the instant invention is that the incorporation of three force sensitive resistive elements disposed proximate to the apexes of a triangular pattern provides for a weight sensor which is mechanically stable.

Yet another advantage of the instant invention is that the incorporation of a diode in parallel with the series combination of force sensitive resistive elements provides a means for diagnosing the operative state of the seat weight sensor.

Yet another advantage of the instant invention is that the incorporation of a diode in parallel with the series combination of force sensitive resistive elements provides a means for measuring ambient temperature for purposes of compensating for the effects of temperature on the characteristics of the force sensitive resistive elements.

Yet another advantage of the instant invention is that the incorporation of a plurality of variable resistance seat weight sensor elements in a vehicle seat provides a means of determining the distribution of weight on the vehicle seat, from which the position of the occupant may be inferred.

Yet another advantage of the instant invention is that the seat weight sensor thereof can enable a rear facing infant seat for which the air bag system is preferably not deployed to be distinguished from an occupant for which the air bag system is preferably deployed.

Yet another advantage of the instant invention is that the seat weight sensor thereof is sufficiently robust, reliable and accurate to enable associated occupant weight dependent control of a controllable occupant restraint system.

Yet another advantage of the instant invention is that the seat weight sensor thereof is relatively inexpensive to produce.

Accordingly, the instant invention provides an improved seat weight sensor that is relatively insensitive to the effects of ambient temperature and pressure; which is simple in construction and relatively robust and reliable in operation; which can be readily incorporated into an automotive seat without interfering with occupant comfort; and which can be produced relatively inexpensively.

The instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

DETAILED DESCRIPTION OF THE PREFERRED EMBODIMENT(S)

Figure 1:
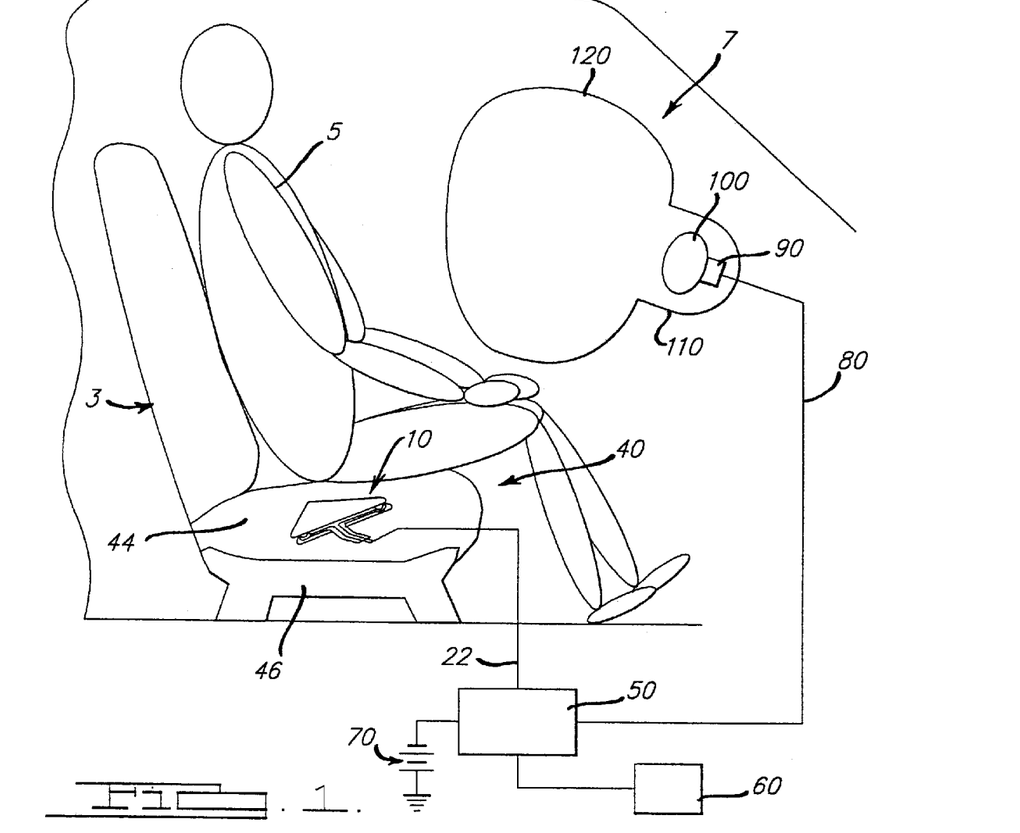
FIG. 1 illustrates the incorporation of the instant invention in a vehicle seat.
Figure 2:
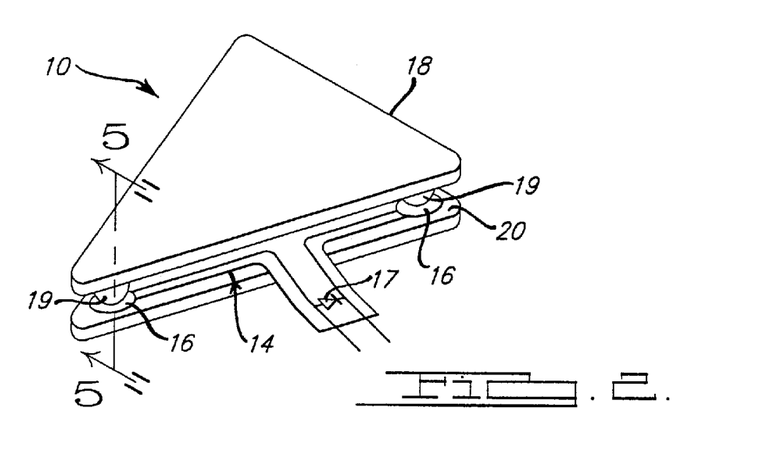
FIG. 2 illustrates an embodiment of a variable resistance seat weight sensor element in accordance with the instant invention.

Referring to FIGS. 1, a seat 3 in a motor vehicle 1 incorporates a variable resistance seat weight sensor 10 mounted in the seat base 40. Referring to FIG. 2, the variable resistance seat weight sensor 10 comprises a plurality of force sensitive resistive elements 16 interposed between a pair of force distributing plates 18, 20 and electrically interconnected in series. The variable resistance seat weight sensor 10 is sandwiched between the seat frame 46 below and the seat cushion foam 44 above.

Figure 8:
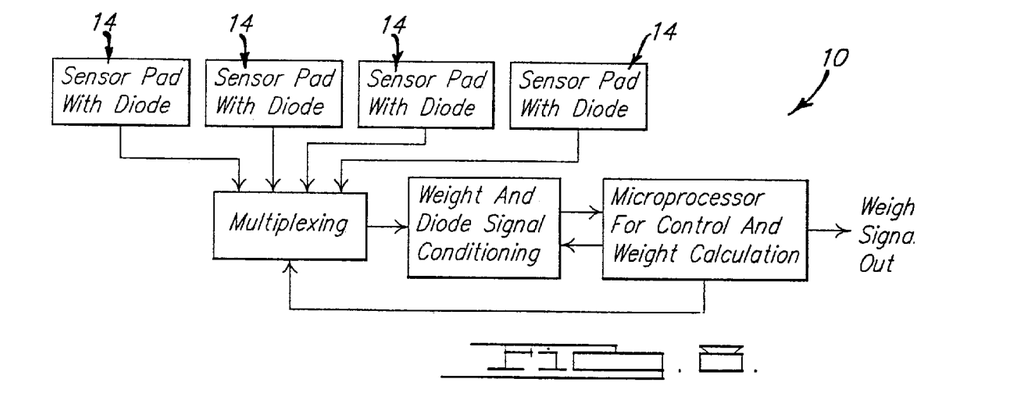
FIG. 8 is a block diagram of a system of the instant invention.

In operation, an occupant 5 seated on the base 40 of seat 3, the composite resistance of the variable resistance seat weight sensor 10 decreases with increasing load. The variable resistance output from the variable resistance seat weight sensor 10 is operably coupled to an electronic control module 50 which converts the pressure signal output 22 to a measure of occupant weight using known analog, digital, or microprocessor circuitry and software. A crash sensor 60 is also operably coupled to the electronic control module 50. Responsive to a crash detected by the crash sensor 60, and further responsive to the sensed weight of the occupant as transformed from the pressure signal output 22, the electronic control module 50 generates a signal 80 which is operably coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Referring to FIGS. 2–5, three force sensitive resistive elements 16 are incorporated into a modular sensor pad 14 at the apexes of triangular layout. The modular sensor pad 14 is provided with alignment holes 34 and mounting holes 36. Associated protrusions 19 incorporated on one the force distributing plates 18 are operatively coupled to each force sensitive resistive elements 16 whereby components of a compressive load applied across the force distributing plates 18, 20 are transferred to respective force sensitive resistive elements 16 thereby causing the resistance vary in inverse relation to the magnitude of the compressive load component. As seen in FIGS. 3a, and 3b, the separate force sensitive resistive elements 16 are electrically connected in series. The force distributing plates 18, 20 act to distribute an applied compressive load amongst the separate force sensitive resistive elements 16 and the protrusions 19 thereon act to concentrate the pressure applied to the associated force sensitive resistive elements 16 so as to amplify the associated output signal of force dependent resistance and thereby provide for improved sensitivity relative to a system without such a means for force concentration.

Figure 3A:
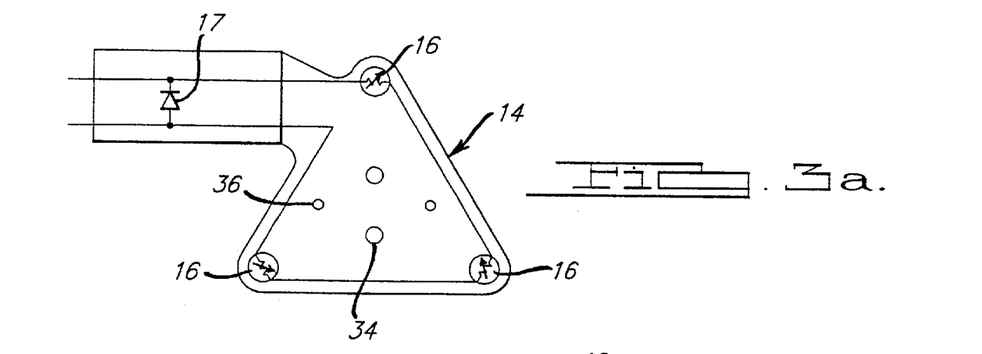
FIG. 3a illustrates a schematic of a variable resistance sensor pad overlaid upon a physical depiction thereof.
Figure 3B:
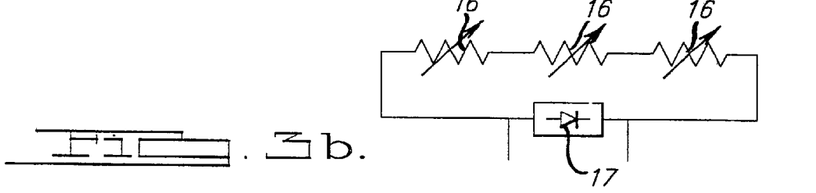
FIG. 3b illustrates a schematic of a variable resistance sensor pad.

Referring to FIGS. 2, 3a, and 3b, a diode 17 is connected in parallel with the series combination of associated force sensitive resistive elements 16 for facilitating the diagnosis of the operative state of the sensor and for providing a measurement of temperature. If electrical connection to the modular sensor pad 14 is cut or broken, a diode drop is not detected across the array in forward bias direction. If signal terminals to the series combination are shorted, a voltage lower then a diode drop is measured across the array in forward bias direction. If the series combination is broken, but the diode 17 remains connected, the forward bias current is reduced.

The temperature of the pad is measured by forward biasing the diode 17 and measuring the voltage drop thereacross. Changes in temperature are measured as changes in the forward drop diode voltage. The forward drop voltage has a temperature coefficient of −2 mV/Deg C. The temperature measurement is advantageous for increasing the reliability of the resistance measurement (and thus a reliable weight measurement) because the resistance of variable force resistors, at a fixed force, changes with temperature. If the temperature is known, the weight can be calculated using a temperature compensating formula.

Figure 4:
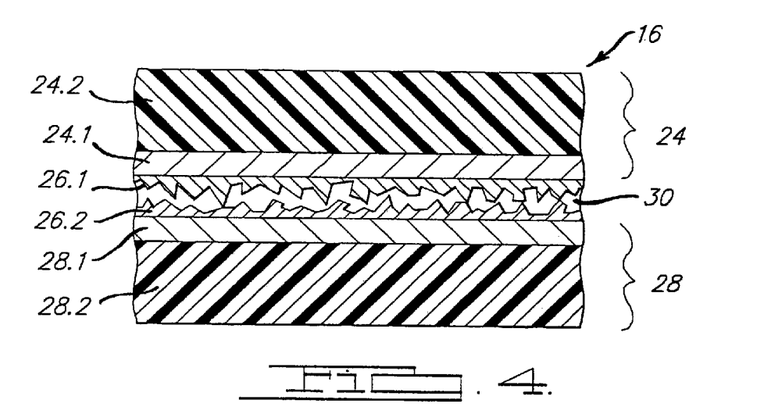
FIG. 4 illustrates a cross section of one form of a force sensitive variable resistance element.

Referring to FIG. 4, one embodiment of a force sensitive resistive element 16 as incorporated into a modular sensor pad 14 comprises polymer substrates 24.2, 28.2; conductors 24.1, 28.1, and force sensitive resistive coatings 26.1, 26.2. Preferably, the polymer layers are constructed from which is semi-flexible and which does not take a set at high temperature, such as Mylar™, Kynar™, Kapton™, or Ultem™. The conductive layers 24.1, 28.1 are applied to the associated flexible substrates by a process known to one of ordinary skill in the art. The force sensitive resistive coatings 26.1, 26.2 are preferably comprise a resistive ink which is applied to the associated conductor 24.1, 28.1. The force sensitive resistive element 16 is known to one of ordinary skill in the art, even to the composition of the preferable resistive ink is proprietary to the supplier thereof. However, the composition of the material constituting the force sensitive resistive coatings 26.1, 26.2 is not considered limiting to the instant invention. For purposes of teaching the instant invention, the force sensitive resistive coating may also comprise a carbon composition as would be incorporated into a carbon microphone, and which is known to one of ordinary skill in the art to have force sensitive resistive characteristics. The force sensitive resistive coatings 26.1, 26.2 exhibit a jagged surface profile, as illustrated in FIG. 4, which is believed to be part of the underlying force sensitive resistance mechanism. In the unloaded state, the force sensitive resistive coatings 26.1, 26.2 contact one another at high points that intersperse the air gap 30 therebetween. The nominal resistance through the force sensitive resistive coatings 26.1, 26.2 in the unloaded state is about 30 Ohms.

Figure 5A:
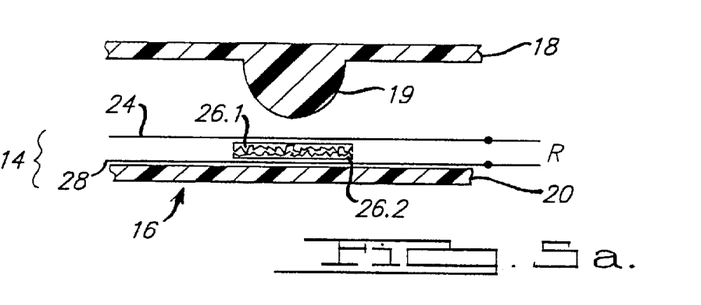
FIG. 5a illustrates a cross section view of a first embodiment of a variable resistance seat weight sensor element, in an unloaded condition.
Figure 5B:
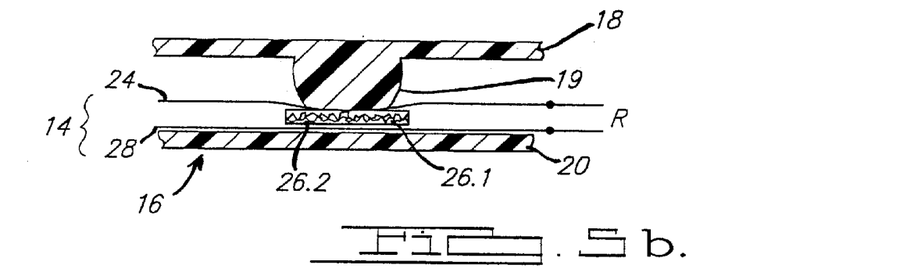
FIG. 5b illustrates a cross section view of a first embodiment of a variable resistance seat weight sensor element, in a loaded condition.
Figure 9:
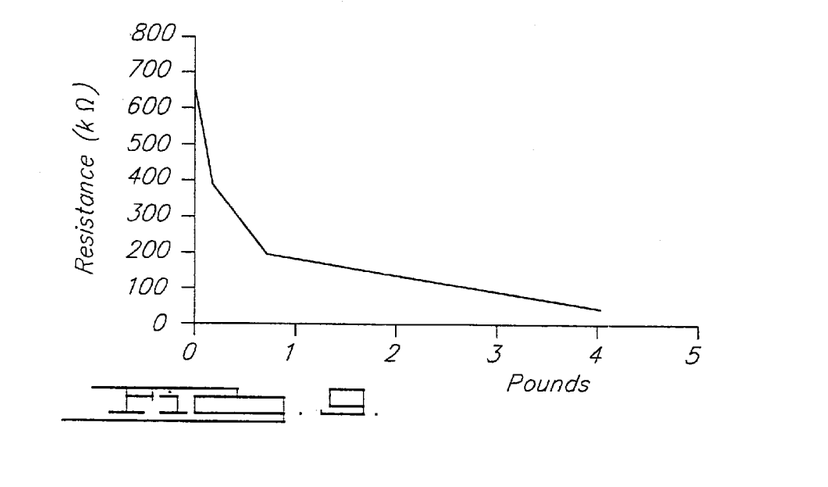
FIG. 9 is an example of graph of an operative characteristic of the instant invention.

Referring to FIGS. 5a and 5b, the compression of the separate force sensitive resistive coatings 26.1, 26.2 against one another between the faces 24, 28 of the modular sensor pad 14 forces the microscopic surface contact area therebetween to increase, thereby decreasing the associated electrical resistance as illustrated in FIG. 9.

Figure 6A:
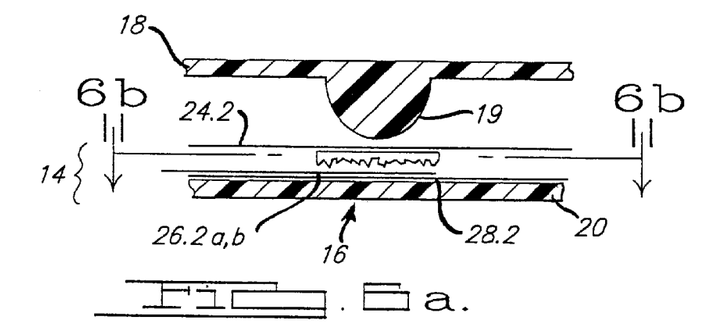
FIG. 6a illustrates a cross section view of a second embodiment of a variable resistance seat weight sensor element, in an unloaded condition.
Figure 6B:
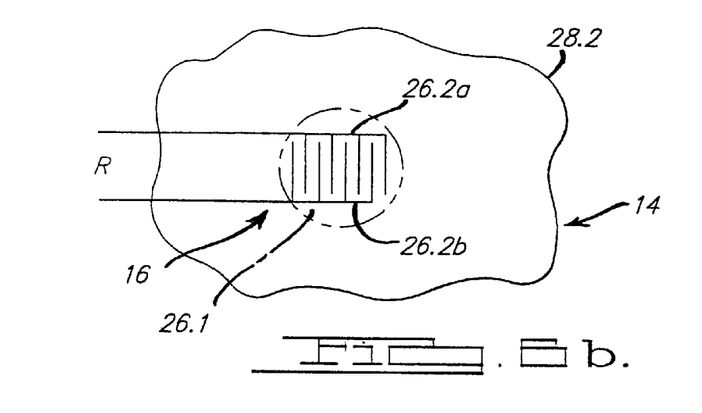
FIG. 6b illustrates a plan view of a second embodiment of a variable resistance seat weight sensor element.

Referring to FIGS. 6a and 6b, in another embodiment of a force sensitive resistive element 16, one of the force sensitive resistive coatings 26.2 is partitioned into a pair of proximate but electrically isolated force sensitive resistive coatings 26.2a,b which preferably are interleaved with respect to one another as shown in FIG. 6b. In operation, a compressive load applied to force distributing plate 18 is applied through protrusion 19 and substrate 24.2 to compress force sensitive resistive coating 26.1 against force sensitive resistive coatings 26.2a,b thereby closing the circuit therebetween so that the resistance between terminals attached to force sensitive resistive coatings 26.2a,b is inversely related to the applied load as illustrated in FIG. 9.

Figure 7:
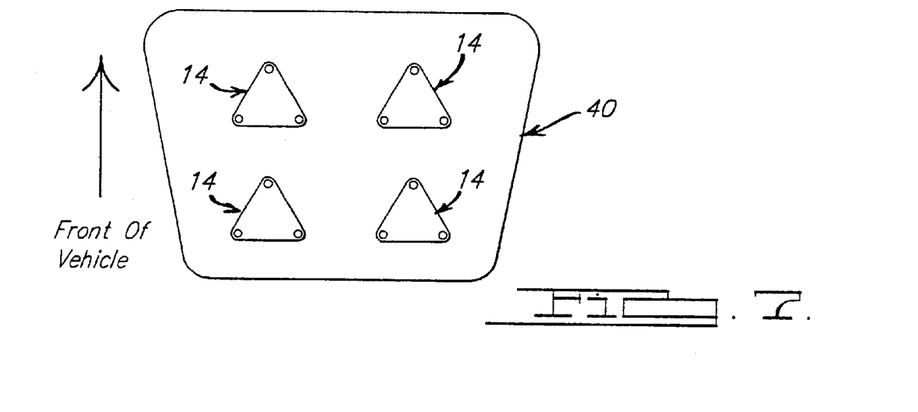
FIG. 7 illustrates the incorporation of plural variable resistance seat weight sensors in a vehicle seat in accordance with a system of the instant invention.

Referring to FIGS. 7 and 8, in another embodiment of the instant invention, a plurality of variable resistance seat weight sensor elements having associated modular sensor pads 14 are incorporated into a seat base 40 for purposes of measuring the distribution of weight on the seat base 40. The individual modular sensor pads 14 could also be further integrated into a single assembly. The output signals from the individual modular sensor pads are multiplexed into a signal processor or microprocessor which then calculates the total weight and the associated weight distribution on the seat in accordance with the operating characteristics of the sensor, for example as illustrated in FIG. 9.

Since the four sensor pad signals are monitored separately, weight distribution information can be determined. Weight distribution information is particularly useful for determining the position of the occupant. If there is more weight on the two sensors that are placed toward the front of the seat than on the sensors in the back of the seat, it is more likely that the person is closer to the instrument panel and thus closer to the air bag. Such information for determining when an occupant is out of position, thereby allowing control over deployment of the bag to insure a safe, and beneficial air bag deployment.

Further, the use of four separate sensors allows the present invention to be less subject to point loads looking artificially heavy. For example, if one sensor pad detects a high load, but the other three do not, then there is a point load that can be disregarded, or at least averaged with the other sensor outputs.

In addition, the triangular design of each sensor pad inherently provides some point load immunity. More specifically, if there is a point load on only one apex of one of the top plates, there will be a high load only on that force sensitive resistive element. Since each modular sensor pads 14 has three resistors in series, if only one of the resistance values drops, the composite resistance remains high. Thus, there must be significant force on all three resistors before the composite resistance can drop to very low levels.

Figure 10:
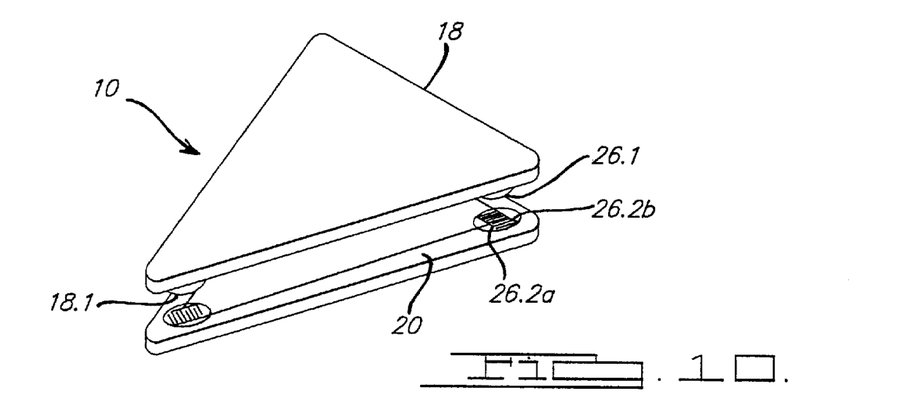
FIG. 10 illustrates a third embodiment of a variable resistance seat weight sensor element.

Referring to FIG. 10, in another embodiment of the instant invention, the force distributing plates 18 and 20 may be constructed from a relatively rigid material such as ceramic, which also serves as the substrate for the force sensitive resistive coatings 26.1 and 26.2a,b. One of the force distributing plates incorporates a plurality of bosses 18.1 to which the force sensitive resistive coatings 26.1 is applied and by which the applied load is concentrated on the associated force sensitive resistive coatings 26.1 and 26.2a, b.

Figure 11A:
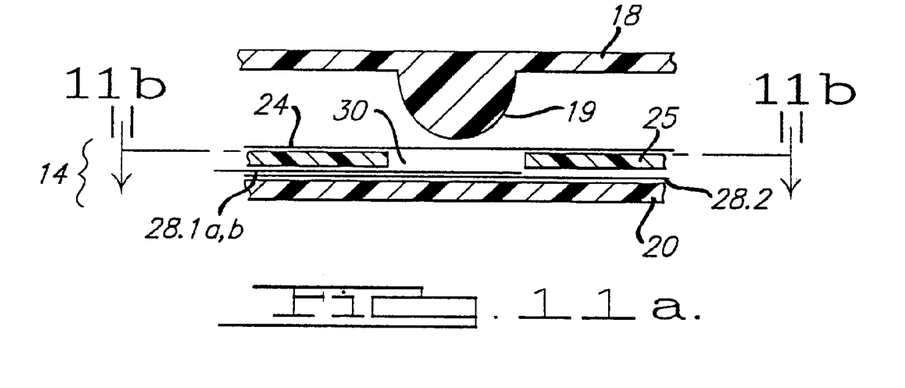
FIG. 11a illustrates a cross section view of a variable capacitance seat weight sensor element, in an unloaded condition.
Figure 11B:
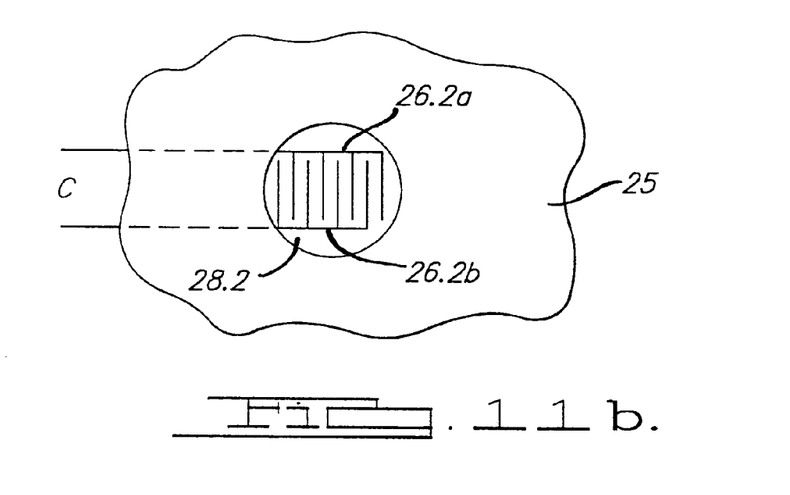
FIG. 11b illustrates a plan view of an embodiment of a variable capacitance seat weight sensor element.
Figure 11C:
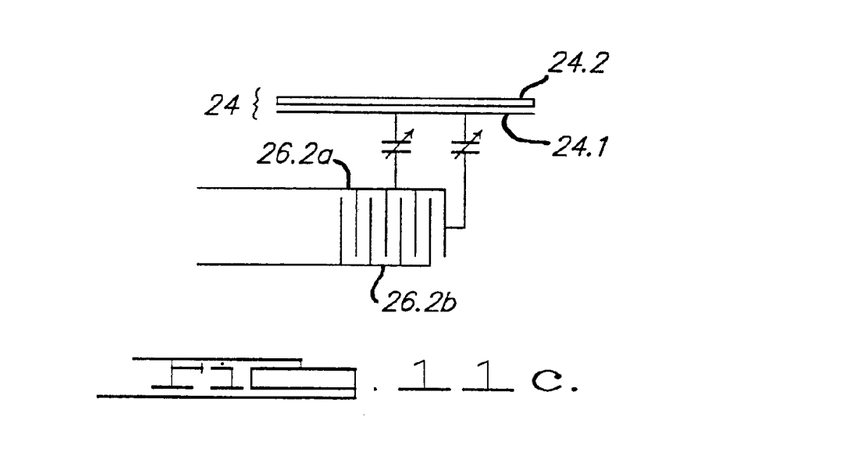
FIG. 11c illustrates the operation of a variable capacitance seat weight sensor element.

Referring to FIGS. 11a,b, and c, in another aspect of the instant invention, a variable capacitance seat weight sensor is formed by interposing a spacer 25 between a first conductively coated substrate 24 and a second substrate 28.2 having an interleaved conductive pattern comprising conductors 28.1a,b (which are designated as 26.2a,b in FIGS. 11b,c). The spacer 25 incorporates an aperture 30 through which protrusion 19 on force distributing plate 18 deflects the conductively coated substrate 24 which within the aperture 30 constitutes a diaphragm membrane. Referring to FIG. 11c, the electrical capacitance between conductors 26.2a,b varies in response to the deflection of substrate 24, whereby the associated electrical capacitance is related to the applied force through the force deflection characteristics of the associated membrane, and by the corresponding relationship of deflected geometry to electrical capacitance.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:
1. A sensor for measuring a compressive load, comprising:
 a. a first plate having first and second sides;
 b. a plurality of protrusions attached to said second side of said first plate;
 c. a second plate having first and second sides, whereby the compressive load is applied across respective said first sides of said first and second plates; and
 d. a plurality of force sensitive resistive elements interposed between respective said second sides of said first and second plates and electrically interconnected in a series combination, each said force sensitive resistive element comprising:
  1) a flexible and elastic first substrate having first and second sides, wherein said first side of said first substrate is operatively coupled to one of said protrusions and said second side of said first substrate is coated with a force sensitive resistive coating over at least a portion of a surface of said second side so as to constitute a first sensor contact; and
  2) a second substrate having first and second sides, wherein said first side of said second substrate is operatively coupled to said second side of said second plate and said second side of said second substrate is coated with a force sensitive resistive coating over at least a portion of the surface of said second side so as to constitute a second sensor contact, whereby said protrusion operatively coupled to said first substrate in cooperation with said second plate thereby compresses said first and second sensor contacts against one another with a component of compressive load so that a resistance between said first and second sensor contacts is dependent upon a magnitude of said component of compressive load.

2. A sensor for measuring a compressive load as recited in claim 1, wherein said first and second substrates for all of said force sensitive resistive elements are each respectively continuous.

3. A sensor for measuring a compressive load as recited in claim 1, further comprising a signal processor operatively coupled to said plurality of force sensitive resistive elements for determining the magnitude of the compressive load from a resistance of said series combination of force sensitive resistive elements.

4. A sensor for measuring a compressive load as recited in claim 3 further comprising a diode connected in parallel with said series combination, whereby an operative state of the sensor is diagnosed by said signal processor.

5. A sensor for measuring a compressive load as recited in claim 1, wherein said second side of said second substrate is coated with a force sensitive resistive coating over a portion of the surface so as to constitute a third sensor contact which is proximate to and distinct from said second sensor contact, whereby said protrusion operatively coupled to said first substrate in cooperation with said second plate thereby compresses said first and third sensor contacts against one another with a component of compressive load so that a resistance between said first and third sensor contacts is dependent upon said magnitude of said component of compressive load.

6. A sensor for measuring a compressive load as recited in claim 5, wherein said first and second substrates for all of said force sensitive resistive elements are each respectively continuous.

7. A sensor for measuring a compressive load as recited in claim 5, further comprising a signal processor operatively coupled to said plurality of force sensitive resistive elements for determining the magnitude of the compressive load from a resistance of said series combination of force sensitive resistive elements.

8. A sensor for measuring a compressive load as recited in claim 7, further comprising a diode connected in parallel with said series combination, whereby an operative state of the sensor is diagnosed by said signal processor.

9. A sensor for measuring a weight of an occupant in a vehicle seat, comprising:
 a. a variable resistance weight sensor element locatable under a seat cushion of the vehicle seat, comprising:
  1) a first plate having first and second sides;
  2) a plurality of protrusions attached to said second side of said first plate;
  3) a second plate having first and second sides, whereby a compressive load is applied across respective said first sides of said first and second plates; and
  4) a plurality of force sensitive resistive elements interposed between respective said second sides of said first and second plates and electrically interconnected in a series combination, each said force sensitive resistive element comprising:
   a) a flexible and elastic first substrate having first and second sides, wherein said first side of said first substrate is operatively coupled to one of said protrusions and said second side of said first substrate is coated with a force sensitive resistive coating over at least a portion of a surface of said second side so as to constitute a first sensor contact; and
   b) a second substrate having first and second sides, wherein said first side of said second substrate is operatively coupled to said second side of said second plate and said second side of said second substrate is coated with a force sensitive resistive coating over at least a portion of the surface of said second side so as to constitute a second sensor contact, whereby said protrusion operatively coupled to said first substrate in cooperation with said second plate thereby compresses said first and second sensor contacts against one another with a component of compressive load so that a resistance between said first and second sensor contacts is dependent upon a magnitude of said component of compressive load; and
 b. a signal processor operatively coupled to said plurality of force sensitive resistive elements for determining the weight of the occupant from a resistance of said series combination of force sensitive resistive elements.

10. A sensor for measuring the weight of an occupant in a vehicle seat as recited in claim 9, wherein said first and second substrates for all of said force sensitive resistive elements are each respectively continuous.

11. A sensor for measuring the weight of an occupant in a vehicle seat as recited in claim 9, further comprising a diode connected in parallel with said series combination, whereby an operative state of the sensor is diagnosed by said signal processor.

12. A sensor for measuring the weight of an occupant in a vehicle seat as recited in claim 9, wherein said second side of said second substrate is coated with a force sensitive resistive coating over a portion of the surface so as to constitute a third sensor contact which is proximate to and distinct from said second sensor contact, whereby said protrusion operatively coupled to said first substrate in cooperation with said second plate thereby compresses said first and third sensor contacts against one another with a component of compressive load so that a resistance between said first and third sensor contacts is dependent upon a magnitude of said component of compressive load.

13. A sensor for measuring the weight of an occupant in a vehicle seat as recited in claim 12, wherein said first and second substrates for all of said force sensitive resistive elements are each respectively continuous.

14. A sensor for measuring the weight of an occupant in a vehicle seat as recited in claim 12, further comprising a diode connected in parallel with said series combination, whereby an operative state of the sensor is diagnosed by said signal processor.

15. A sensor for measuring a compressive load, comprising:
 a. a first plate having first and second sides;
 b. a plurality of protrusions attached to said second side of said first plate;
 c. a second plate having first and second sides, whereby the compressive load is applied across respective said first sides of said first and second plates; and
 d. a plurality of force sensitive resistive elements interposed between respective said second sides of said first and second plates and electrically interconnected in a series combination, each said force sensitive resistive element comprising:
  1) a force sensitive resistive coating over at least a portion of a surface of said protrusion so as to constitute a first sensor contact; and
  2) a force sensitive coating over a portion of said second side of said second plate at a location proximate said first sensor contact when said first plate abuts said second plate, so as to constitute a second sensor contact, whereby said protrusion in cooperation with said second plate thereby compresses said first and second sensor contacts against one another with a component of compressive load so that a resistance between said first and second sensor contacts is dependent upon a magnitude of said component of compressive load.

16. A sensor for measuring a compressive load as recited in claim 15, further comprising a signal processor operatively coupled to said plurality of force sensitive resistive elements for determining the magnitude of the compressive load from a resistance of said series combination of force sensitive resistive elements.

17. A sensor for measuring a compressive load as recited in claim 16, further comprising a diode connected in parallel with said series combination, whereby an operative state of the sensor is diagnosed by said signal processor.

18. A sensor for measuring a compressive load as recited in claim 15, further comprising a force sensitive coating over a portion of said second side of said second plate at a location proximate said first sensor contact when said first plate abuts said second plate, so as to constitute a third sensor contact that is proximate to and distinct from said second sensor contact, whereby said protrusion in cooperation with said second plate thereby compresses said first and third sensor contacts against one another with a component of compressive load so that a resistance between said first and third sensor contacts is dependent upon a magnitude of said component of compressive load.

19. A sensor for measuring a compressive load as recited in claim 18, further comprising a signal processor operatively coupled to said plurality of force sensitive resistive elements for determining the magnitude of the compressive load from a resistance of said series combination of force sensitive resistive elements.

20. A sensor for measuring a compressive load as recited in claim 19, further comprising a diode connected in parallel with said series combination, whereby an operative state of the sensor is diagnosed by said signal processor.

21. An occupant sensor locatable in a vehicle seat, comprising:
 a. a plurality of variable resistance weight sensor elements locatable under a seat cushion of the vehicle seat, each said variable resistance weight sensor element comprising:
  1) a first plate having first and second sides;
  2) a plurality of protrusions attached to said second side of said first plate;
  3) a second plate having first and second sides, whereby a compressive load is applied across respective said first sides of said first and second plates; and
  4) a plurality of force sensitive resistive elements interposed between respective said second sides of said first and second plates and electrically interconnected in a series combination, each said force sensitive resistive element comprising:
   a) a flexible and elastic first substrate having first and second sides, wherein said first side of said first substrate is operatively coupled to one of said protrusions and said second side of said first substrate is coated with a force sensitive resistive coating over at least a portion of the surface of said second side so as to constitute a first sensor contact; and
   b) a second substrate having first and second sides, wherein said first side of said second substrate is operatively coupled to said second side of said second plate and said second side of said second substrate is coated with a force sensitive resistive coating over at least a portion of the surface of said second side so as to constitute a second sensor contact, whereby said protrusion operatively coupled to said first substrate in cooperation with said second plate thereby compresses said first and second sensor contacts against one another with a component of compressive load so that a resistance between said first and second sensor contacts is dependent upon a magnitude of said component of compressive load; and
 b. a signal processor operatively coupled to said plurality of force sensitive resistive elements for determining the weight distribution of the occupant from a resistance of said series combinations of force sensitive resistive elements from each respective variable resistance weight sensor element of said plurality of variable resistance weight sensor elements.

22. An occupant sensor locatable in a vehicle seat as recited in claim 21, wherein said second side of said second substrate is coated with a force sensitive resistive coating over a portion of the surface so as to constitute a third sensor contact which is proximate to and distinct from said second sensor contact, whereby said protrusion operatively coupled to said first substrate in cooperation with said second plate thereby compresses said first and third sensor contacts against one another with a component of compressive load so that a resistance between said first and third sensor contacts is dependent upon a magnitude of said component of compressive load.

23. A sensor for measuring a compressive load, comprising:
 a. a substrate having an aperture;
 b. a first conductor disposed across said aperture proximate to a first side of said substrate;
 c. a second conductor disposed at least partially across said aperture proximate to a second side of said substrate; and
 d. a first plate having a protrusion operatively coupled to said first conductor, wherein the compressive load is applied across said first plate and said substrate so as to cause a deformation by said protrusion of said first conductor relative to said second conductor, and a capacitance between said first and second conductors is responsive to a magnitude of the compressive load.

24. A sensor for measuring a compressive load as recited in claim 23, further comprising a third conductor disposed at least partially across said aperture proximate to a second side of said substrate, wherein said third conductor is electrically isolated from said second conductor, and a capacitance between said first and third conductors is responsive to said magnitude of the compressive load.

\* \* \* \* \*